(12) United States Patent
Kim

(10) Patent No.: US 6,571,018 B1
(45) Date of Patent: May 27, 2003

(54) ENCODING AND/OR DECODING SYSTEM FOR THREE-DIMENSIONAL COLOR ULTRASONIC IMAGE

(75) Inventor: Sang Hyun Kim, Seoul (KR)

(73) Assignee: Medison Co., Ltd. (KR)

( * ) Notice: Subject to any disclaimer, the term of this patent is extended or adjusted under 35 U.S.C. 154(b) by 0 days.

(21) Appl. No.: 09/368,027

(22) Filed: Aug. 3, 1999

(30) Foreign Application Priority Data

Apr. 6, 1999 (KR) ............................................. 99-11800

(51) Int. Cl.[7] .............................. G06K 9/36; G06K 9/00; G06F 17/00; A61B 8/14
(52) U.S. Cl. ....................... 382/245; 382/235; 382/166; 382/165; 382/154; 128/922; 600/437
(58) Field of Search .................................. 382/164, 165, 382/166, 169, 170, 154, 245, 246, 247, 244, 243, 128, 131, 132, 159, 190, 224, 227, 235, 237, 282, 295; 128/920, 922; 600/300, 407, 437

(56) References Cited

U.S. PATENT DOCUMENTS

| | | | |
|---|---|---|---|
| 5,754,676 A | * | 5/1998 | Komiya et al. ............. 382/132 |
| 5,835,034 A | * | 11/1998 | Seroussi et al. ............. 341/65 |
| 5,984,870 A | * | 11/1999 | Giger et al. ................ 600/443 |
| 6,042,545 A | * | 3/2000 | Hossack et al. ............ 600/443 |

FOREIGN PATENT DOCUMENTS

| | | |
|---|---|---|
| JP | 5048909 | 2/1993 |
| JP | 6178122 | 6/1994 |

* cited by examiner

Primary Examiner—Jayanti K. Patel
Assistant Examiner—Yosef Kassa
(74) Attorney, Agent, or Firm—F. Chau & Associates, LLP

(57) ABSTRACT

A three-dimensional color ultrasonic encoding and/or decoding system is provided in which a three-dimensional color ultrasonic image is classified into zero pixel data, gray pixel data and indexed color pixel data, to thereby perform encoding and decoding based on the classification data. The encoding and/or decoding system includes an encoding system including a classifier, a first encoder for encoding gray pixel data and a second encoder for encoding indexed color pixel data, a run-level encoder, a pixel separator and a multiplexer, and a decoding system including a demultiplexer, a run-level decoder, a first decoder for decoding gray pixel data, a second decoder for decoding indexed color pixel data and an image mixer. The inventive system classifies the three-dimensional color ultrasonic image into classes in which pixels having higher correlation belong to the same classes, and encodes and decodes each pixel based on the classification data, with a result that an image can be losslessly encoded at a hight compression rate than in the conventional lossless encoding. The indexed color pixel data is separately classified from the gray pixel data and is separately encoded therefrom, which enables a three-dimensional color ultrasonic lossy encoding which is not possible in the conventional methods.

13 Claims, 2 Drawing Sheets

| CLASS | ZERO PIXEL | GRAY PIXEL | INDEXED COLOR PIXEL |
|---|---|---|---|
| PIXEL VALUE | 0 | $P_1$ | $P_2$ |

ENCODING AND/OR DECODING SYSTEM FOR THREE-DIMENSIONAL COLOR ULTRASONIC IMAGE

BACKGROUND OF THE INVENTION

1. Field of the Invention

The present invention relates to an encoding and/or decoding system for three-dimensional color ultrasonic image.

2. Description of the Related Art

In general, a JPEG encoding method is widely used for encoding ultrasonic images. The JPEG encoding method is classified into a lossless encoding method and a lossy encoding method. The lossless encoding method can keep original information even with passing through processes of compression and expansion, and the lossy encoding method cannot restore original information completely since loss of information occurs in the processes of compression and expansion. Although the lossless encoding method has a lower compression rate compared to the lossy encoding method, the former can keep an original quality of image better than the latter. Thus the lossless encoding method is more efficient for applications which do not allow degradation of image quality. Also, although the lossy encoding method cannot regenerate an original image completely, it can obtain a considerably practical decoded image quality even in a high compression rate.

As shown in FIG. 1, three-dimensional color ultrasonic image data is classified into zero pixel data, gray pixel data, and indexed color pixel data having a pixel value of 0, P1 and P2, respectively. In FIG. 1, zero pixel data has a pixel value of 0, and gray pixel data has a pixel value of P1 in which original gray brightness values of eight bits (0–255) are quantized into six bits from 1 to 63 except 0. The indexed color pixel data has a pixel value of P2 in which 24-bit color data of R, G, and B is indexed into 64 up to 255, using a predetermined color index table. In order to encode three-dimensional color ultrasonic images including the indexed color pixel data, only the JPEG lossless encoding method is used among the conventional JPEG encoding methods, which will be described with reference to FIG. 2.

FIG. 2 is a block diagram showing a conventional JPEG lossless encoding and decoding system. In the encoding portion, a subtracter 21 subtracts a predictive value Pm which is predicted from a previous pixel brightness value from an original pixel brightness value Pn, to thereby obtain a predictive error En. The predictive error En obtained in the subtracter 21 is output to a quantizer 22. The quantizer 22 receives the predictive error En from the subtracter 21 and performs quantization. An entropy encoder 23 receives an output value from the quantizer 22 and performs an entropy encoding by means of Huffman coding, to thereby provide a bitstream to the decoding portion. Meanwhile, the output value of the quantizer 22 is input to an adder 24 in addition to the entropy encoder 23. The adder 24 outputs an addition result, that is, a previous pixel brightness value Pn−1 to a first predictor 25 in order to predict a brightness value of a following input pixel. In the decoding portion, an entropy decoder 26 entropy-decodes the input bitstream. The entropy-decoded data is inversely quantized in an inverse quantizer 27 to thereby generate a predictive error En. An adder 28 receives the predictive error En generated in the inverse quantizer 27 and adds it to a predictive value Pm output from a second predictor 29, thereby outputting the original pixel brightness value Pn.

The above-described three-dimensional color ultrasonic images contains (locally existing indexed color pixel data, causing that the JPEG lossy encoding method cannot be applied thereto. Also, although the three-dimensional color ultrasonic image composed of different data such as zero pixel data, gray pixel data and indexed color pixel data uses a JPEG lossless encoding method which encodes images using an inter-pixel correlation, the efficiency thereof is considerably lowered due to the characteristics of the three-dimensional color ultrasonic image.

SUMMARY OF THE INVENTION

To solve the above problems, it is an object of the present invention to provide an encoding and/or decoding system for three-dimensional color ultrasonic images, in which a three-dimensional color ultrasonic image is classified into classes having similar characteristics and encoding and/or decoding them, thereby applying a lossless encoding method more efficiently to the three-dimensional color ultrasonic image and also applying a lossy encoding method thereto.

To accomplish the object according to one aspect of the present invention, there is provided a three-dimensional color ultrasonic image encoding system comprising: a classifier for classifying input ultrasonic image data into zero pixel data, gray pixel data and indexed color pixel data and outputting the classification data; a pixel separator for separating and outputting the gray pixel data and the indexed color pixel data from the input ultrasonic image data, based on the classification data in the classifier; a run-level encoder for run-level-encoding the classification data from the classifier and outputting the run-level-encoded data; encoding means for individually compressing and encoding the gray pixel data and the indexed color pixel data separated from the pixel separator; and a multiplexer for multiplexing the encoded data respectively in the run-level encoder and the encoding means.

According to another aspect of the present invention, there is also provided a three-dimensional color ultrasonic image decoding system comprising: a demultiplexer for demultiplexing encoded data and outputting encoded classification data, encoded color pixel data and encoded gray pixel data; a run-level decoder for run-level-decoding the encoded classification data and outputting the classification data for discerning zero pixel data, gray pixel data and indexed color pixel data; decoding means for individually decoding the encoded gray pixel data and the encoded indexed color pixel data; and an image mixer for generating zero pixel data and mixing the gray pixel data and the indexed color pixel data supplied from the decoding means with the zero pixel data, thereby outputting an ultrasonic image.

BRIEF DESCRIPTION OF THE DRAWINGS

The object and other advantages of the present invention will become more apparent by describing in detail the structures and operations of the present invention with reference to the accompanying drawing, in which.

DETAILED DESCRIPTION OF THE PREFERRED EMBODIMENTS

Figures 1, 2:
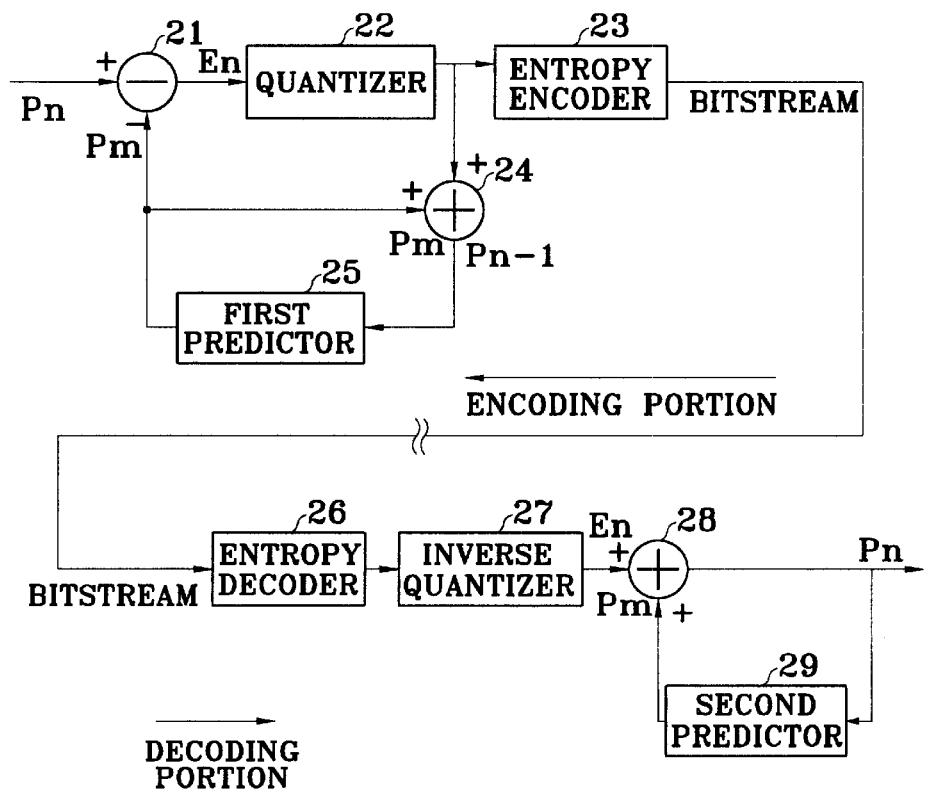
FIG. 1 is a view for explaining a three-dimensional color ultrasonic image data.
FIG. 2 is a block diagram showing a conventional JPEG lossless image encoding and decoding system.

A preferred embodiment of the present invention will be described with reference to the accompanying drawings, in which elements having the same reference numerals perform the same functions.

Figure 3:
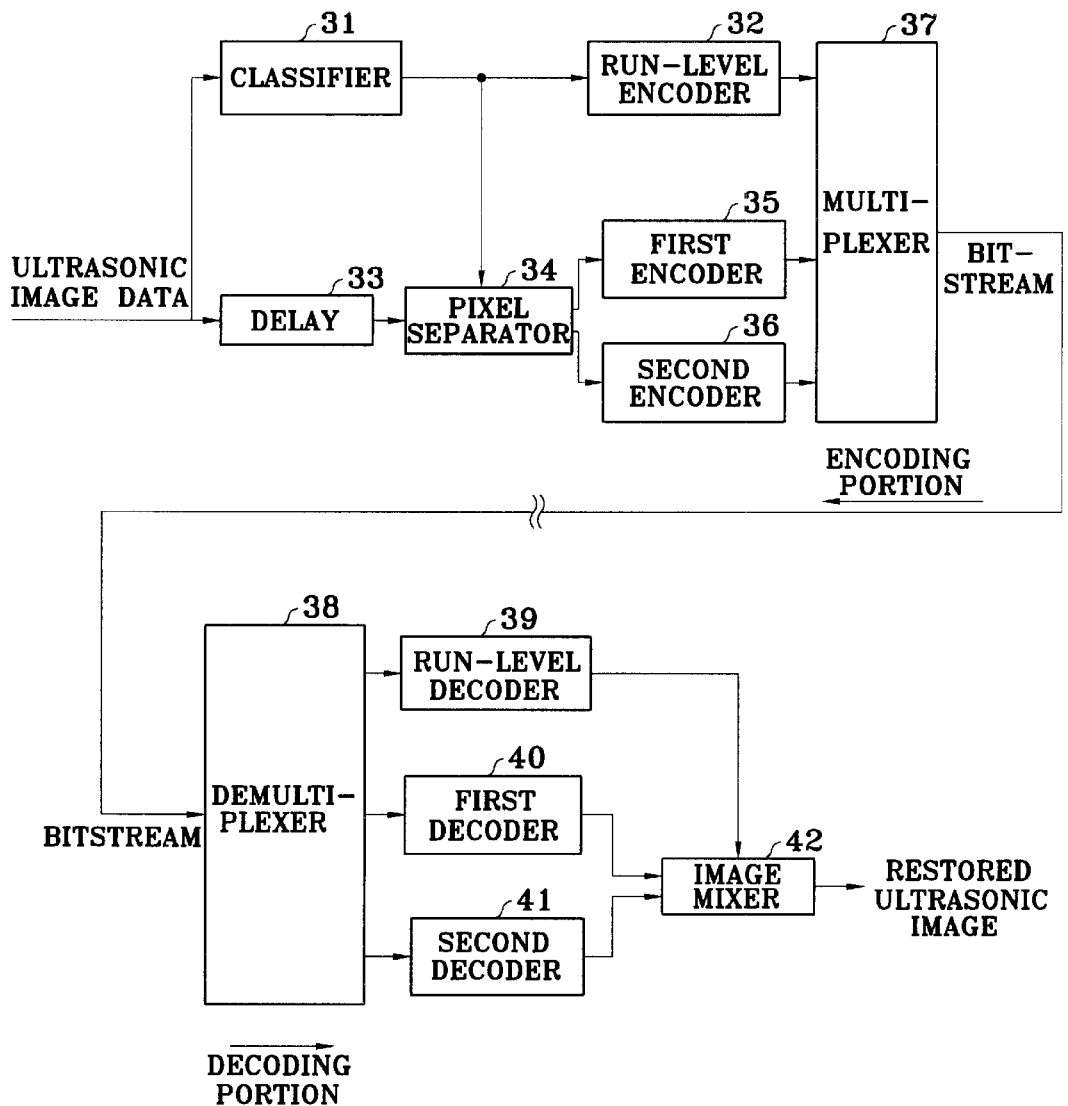
FIG. 3 is a block diagram showing a three-dimensional color ultrasonic image encoding and decoding system according to a preferred embodiment of the present invention.

In FIG. 3, a three-dimensional color ultrasonic image encoding and decoding system according to a preferred embodiment of the present invention, includes an encoding portion for classifying three-dimensional color ultrasonic image data (hereinafter referred to as ultrasonic image data), encoding the classified pixel data, multiplexing the classified data, and transmitting a bitstream, and a decoding portion for demultiplexing the received bitstream and decoding the demultiplexed data. The encoding portion of FIG. 3 includes a classifier 31 and a delay 33 both of which receive ultrasonic image data, a run-level encoder 32 for run-level-encoding classification data supplied from the classifier 31, and a pixel separator 34 for separating respective pixel data of the ultrasonic image data input from the delay 33. The encoding portion also includes a first encoder 35 and a second encoder 36 for encoding the respective pixel data separated in and output from the pixel separator 34. The encoding portion also includes a multiplexer 37 for multiplexing data output from the run-level encoder 32, the first encoder 35 and the second encoder 36. The multiplexer 37 multiplexes the input data in the form of a bitstream and transmits the bitstream to the decoding portion. Meanwhile, the decoding portion of FIG. 3 includes a demultiplexer 38 for receiving the bitstream output from the encoding portion and demultiplexing the received bitstream, a run-level decoder 39, a first decoder 40 and a second decoder 41. The decoding portion also includes an image mixer 42 for mixing the output data from the run-level decoder 39, the first decoder 40 and the second decoder 41 and outputting a restored ultrasonic image.

The operation of the FIG. 3 system will be described below in more detail.

In the encoding portion of FIG. 3, input ultrasonic image data is input to the classifier 31 and the delay 33. The delay 33 delays the input ultrasonic image data until the classification operation of the classifier 31 is completed according to each pixel data and outputs the delayed result to the pixel separator 34. The classifier 31 classifies each pixel data of the input ultrasonic image data into classes as shown in FIG. 1. That is, the classifier 31 classifies the ultrasonic image data into zero pixel data, gray pixel data and indexed color pixel data and outputs the classification data corresponding to each pixel data to the run-level encoder 32 and the pixel separator 34. Here, the classification data is data for representing a class of each pixel data. The run-level encoder 32 run-level-encodes the classification data input from the classifier 31 and outputs to the multiplexer 37. The run-level encoder 32 performs a run-level encoding in which the number of zero pixel value is taken as a value of run, with respect to successive zero pixel data among the classification data, and the classification data is taken as a value of level, with respect to the gray pixel value and the indexed color pixel value. Meanwhile, the pixel separator 34 separates each pixel data of the ultrasonic image data input from the delay 33, based on the classification data of the classifier 31. That is, the pixel separator 34 outputs the separated result to the first encoder 35 in the case that each pixel data of the input ultrasonic image data is gray pixel data, and outputs the separated result to the second encoder 36 in the case that the former is indexed color pixel data, based on the classification data of the classifier 31. Then, the first encoder 35 compressively encodes the gray pixel data supplied from the pixel separator 34 by using a lossy or lossless encoding method according to a user's selection. Meanwhile, the second encoder 36 compressively encodes the indexed color pixel data supplied from the pixel separator 34 by using a lossless encoding method. The multiplexer 37 receives the encoded data from the run-level encoder, the first encoder 35 and the second encoder 36, multiplexes the received encoded data and transmits the multiplexed result, that is, a bitstream to the decoding portion.

In the decoding portion of FIG. 3, the demultiplexer 38 demuliplexes the received bitstream and outputs the demultiplexed result to the run-level decoder 39, the first decoder 40 and the second decoder 41. The run-level decoder 39 run-level-decodes the received encoded classification data and outputs classification data for discerning the zero pixel data gray pixel data and indexed color pixel data to the image mixer 42. The first decoder 40 decodes the encoded gray pixel data received from the demultiplexer 38 and outputs the decoded result to the image mixer 42. Meanwhile, the second decoder 41 decodes the encoded indexed color pixel data and outputs the decoded result to the image mixer 42. The image mixer 42 generates zero pixel data based on the classification data output from the run-level decoder 39, and mixes the gray pixel data and the indexed color pixel data with the zero pixel data, to thereby output a three-dimensional color ultrasonic image. The image mixer 42 outputs one of the zero pixel data, the gray pixel data supplied from the first decoder 40 and the indexed color pixel data supplied from the second decoder 41, according to which one of the zero pixel data, the gray pixel data and the indexed color pixel data is indicated by the classification data, and restores an original ultrasonic image without deformation and loss.

In the above embodiment, the first encoder 35 for encoding the gray pixel data can perform a lossy or lossless encoding according to a user's selection. That is, in the case that a lossy encoding is intended to operate, a one-dimensional ADPCM encoding method is used. In the case that a lossless encoding is intended to operate, a one-dimensional DPCM encoding method is used. Also, the second encoder for encoding the indexed color pixel data can perform only the lossless encoding due to the properties of the index color. In the above embodiment, the one-dimensional DPCM encoding method is used. The structure of the first and second decoder in the decoding portion of the above embodiment corresponds to those of the encoding portion, to thereby decode an ultrasonic image.

As described above, the present invention classifies the three-dimensional color ultrasonic image data according to the characteristics thereof, encodes and decodes the classification data, and encodes and decodes each pixel data of the ultrasonic image data based on the classification data, with a result that color ultrasonic image data can be processed more efficiently than in the conventional lossless encoding method, that is, a JPEG lossless encoding method. Also, the present invention applies a lossy encoding which is not possible in the conventional method to only the gray pixel selectively, and provides a function of encoding and/or decoding a three-dimensional color ultrasonic image at a high compression rate in the state where a subjective image quality of the restored image rarely degrades.

What is claimed is:

1. A three-dimensional color ultrasonic image encoding system comprising:
 a classifier for classifying input ultrasonic image data into zero pixel data, gray pixel data and indexed color pixel data and outputting classification data;

a pixel separator for separating the gray pixel data and the indexed color pixel data from the input ultrasonic image data, based on the classification data in the classifier and outputting separated results;

a run-level encoder for run-level-encoding the classification data from the classifier and outputting a run-level-encoded data;

encoding means for compressively encoding the gray pixel data and the indexed color pixel data separated from the pixel separator; and a multiplexer for multiplexing the encoded data respectively in the run-level encoder and the encoding means.

2. The encoding system according to claim 1, further comprising a delay for delaying the input ultrasonic image data during classification of said classifier.

3. The encoding system according to claim 1, wherein said run-level encoder performs a run-level encoding while having the number of successive zero pixel values as a run value, and having classification data corresponding to the gray pixel value and the indexed color pixel value as a level value.

4. The encoding system according to claim 1, wherein said encoding means comprises a first encoder for compressively encoding the gray pixel data and a second encoder for compressively encoding the indexed color pixel data.

5. The encoding system according to claim 4, wherein said first encoder encodes the gray pixel data by using one of a lossy compressive encoding method and a lossless compressive encoding method according to a user's selection.

6. The encoding system according to claim 4, wherein said second encoder compressively encodes the indexed color pixel data by using a lossless encoding method.

7. A three-dimensional color ultrasonic image decoding system comprising:

a demultiplexer for demultiplexing encoded data and outputting encoded classification data, encoded indexed color pixel data and encoded gray pixel data;

a run-level decoder for run-level-decoding the encoded classification data and outputting classification data for discerning zero pixel data, gray pixel data and indexed color pixel data;

decoding means for decoding the encoded gray pixel data and the encoded indexed color pixel data; and an image mixer for generating zero pixel data based on the classification data output from the run-level decoder and mixing the gray pixel data and the indexed color pixel data supplied from the decoding means with the zero pixel data, thereby outputting an ultrasonic image.

8. The decoding system according to claim 7, wherein said run-level decoder performs a run-level decoding in which the number of successive zero pixel values is used as a run value and the gray pixel value or indexed color pixel value is used as a level value.

9. The decoding system according to claim 7, wherein said decoding means comprises a first decoder for decoding the encoded gray pixel data and outputting the decoded result; and a second decoder for decoding the encoded indexed color pixel data and outputting the indexed color pixel data.

10. The decoding system according to claim 9, wherein said first decoder decodes the encoded gray pixel data using one of a lossy and lossless compressive encoding methods based on an encoding method used in an encoding portion.

11. The decoding system according to claim 9, wherein said second decoder losslessly decodes the encoded input indexed color pixel data.

12. The decoding system according to claim 9, wherein said image mixer: outputs one of the generated zero pixel data, the gray pixel data supplied from the first decoder, and the indexed color pixel data supplied from the second decoder; indicates one of the zero pixel data, the gray pixel data and the indexed color pixel data by the classification data; and restores an original ultrasonic image.

13. A three-dimensional color ultrasonic image encoding and decoding system comprising:

an encoding portion comprising: a classifier for classifying input ultrasonic image data into zero pixel data, gray pixel data and indexed color pixel data and outputting classification data; a pixel separator for separating and outputting the gray pixel data and the indexed color pixel data from the input ultrasonic image data, based on the classification data in the classifier; a run-level encoder for run-level encoding the classification data from the classifier and outputting the run-level-encoded data; encoding means for compressing and encoding the gray pixel data and the indexed color pixel data separated from the pixel separator; and a multiplexer for multiplexing the encoded data respectively in the run-level encoder and the encoding means, and a decoding portion comprising: a demultiplexer for demultiplexing encoded data and outputting encoded classification data, encoded color pixel data and encoded gray pixel data; a run-level decoder for run-level-decoding the encoded classification data and outputting classification data for discerning zero pixel data, gray pixel data and indexed color pixel data; decoding means for decoding the encoded gray pixel data and the encoded indexed color pixel data; and an image mixer for generating zero pixel data and mixing the gray pixel data and the indexed color pixel data supplied from the decoding means with the zero pixel data, thereby outputting an ultrasonic image.

* * * * *